United States Patent [19]

Tomita et al.

[11] Patent Number: 5,252,677
[45] Date of Patent: Oct. 12, 1993

[54] FUNCTIONALIZED OLEFIN POLYMERS

[75] Inventors: Masayuki Tomita; Hiroshi Nakano; Hideshi Uchino; Toshihiko Sugano; Mitsutoshi Aritomi, all of Yokkaichi, Japan

[73] Assignee: Mitsubishi Petrochemical Company Limited, Tokyo, Japan

[21] Appl. No.: 553

[22] Filed: Jan. 4, 1993

Related U.S. Application Data

[63] Continuation of Ser. No. 794,940, Nov. 20, 1991, abandoned.

[30] Foreign Application Priority Data

Nov. 20, 1990 [JP] Japan ................... 2-314630
Nov. 20, 1990 [JP] Japan ................... 2-314631
Nov. 28, 1990 [JP] Japan ................... 2-326442

[51] Int. Cl.$^5$ ............ C08F 8/08; C08F 8/34; C08F 10/06; C08F 110/06
[52] U.S. Cl. ............ 525/333.9; 525/333.7; 526/160; 526/170; 526/348.2; 526/348.4; 526/348.6; 526/348.7; 526/351
[58] Field of Search ............ 525/333.7, 333.9; 526/160, 170

[56] References Cited

U.S. PATENT DOCUMENTS

| | | | |
|---|---|---|---|
| 3,305,538 | 2/1967 | Natta et al. | 526/351 |
| 3,364,190 | 1/1968 | Emrick et al. | 526/351 |
| 4,892,851 | 1/1990 | Ewen et al. | 526/160 |
| 5,030,695 | 7/1991 | Cozewith et al. | 525/333.9 |

FOREIGN PATENT DOCUMENTS

| | | |
|---|---|---|
| 0327283 | 10/1981 | European Pat. Off. . |
| 0177347 | 4/1986 | European Pat. Off. . |
| 0295026 | 12/1988 | European Pat. Off. . |
| 0351392 | 1/1990 | European Pat. Off. . |

Primary Examiner—Joseph L. Schofer
Assistant Examiner—David Wu
Attorney, Agent, or Firm—Oblon, Spivak, McClelland, Maier & Neustadt

[57] ABSTRACT

A functionalized polymer having excellent adhesion, printability, and compatibility in polymer blends or the like which are obtained by introducing an epoxy group, a hydroxyl group or a sulfonic group into a syndiotactic α-olefin polymer having an olefinic unsaturated bond at its terminus is disclosed. The terminal unsaturated syndiotactic α-olefin polymer is obtained by polymerizing an α-olefin with a catalyst comprising the combination of a metallocene compound and an alumoxane, and the functional groups are obtained by the oxidation, sulfonation or the like of the terminal unsaturated group, by the addition of a compound containing the corresponding functional group to the unsaturated bond, or by the conversion of a precursor polymer containing a precursor of the functional group into a polymer containing the functional group desired.

17 Claims, No Drawings

FUNCTIONALIZED OLEFIN POLYMERS

This application is a continuation of application Ser. No. 07/794,940, filed on Nov. 20, 1991, now abandoned.

BACKGROUND OF THE INVENTION

The present invention relates to functionalized olefin polymers which have excellent adhesion, printability, and compatibility in polymer blends or the like, and which are obtained by introducing an epoxy group, a hydroxyl group or a sulfonic group into syndiotactic α-olefin polymers having an olefinic unsaturated bond at the end.

FIELD OF THE ART

Homopolymers or copolymers of α-olefins have excellent properties such as mechanical strength, gloss, transparency, moldability, moisture resistance, chemical resistance or the like in addition to their inexpensiveness. The α-olefin polymers, however, are non-polar in their molecular structure and poor in affinity to other materials and thus have inferior properties such as adhesion, printability, compatibility in polymer blends or the like.

RELATED ART

Accordingly, attempts have hitherto been made to introduce a variety of functional groups into the α-olefin polymers in order to improve their properties. An epoxy group among the functional groups is believed to be very useful, as it reacts rapidly with a variety of the other functional groups such as a hydroxyl group, a sulfonic group, a carboxylic acid group, an acid anhydride group, an acid halide group, an ester group, a halogenated hydrocarbon group, a mercapto group, an isocyanato group or the like to produce a corresponding chemical bond.

As one of the methods for introducing an epoxy group into the α-olefin polymer, a method for modifying an unsaturated copolymer resin of propylene with a linear non-conjugated diene by introducing an epoxy group into the olefinic unsaturated bond in the copolymer (Japanese Patent Laid-Open Publication No. 85405/1986) has been proposed. In this method, however, it was difficult, to the best of our knowledge, to epoxidize substantially all of the unsaturated bonds, and gelation was sometimes caused on the fabrication such as molding of the resin, so that the use of this method was limited to some special cases. Further, this method may require a large amount of the expensive linear non-conjugated diene to be copolymerized due to its low copolymerizability and may give only a low production yield of the copolymer to the amount of a catalyst used, that is, a low catalyst activity.

On the other hand, Japanese Patent Laid Open Publication No. 132605/1989 discloses a modification product of an α-olefin polymer in a solution by epoxidation. However, none of the products obtained by the method may exhibit sufficient mechanical strength at any practical level as a molded article and have compatibility in a polymer blend to any satisfactory level, so that a still further improvement of the method may be desired, as long as we are aware.

As one of the methods for introducing a hydroxy group into the α-olefin polymer, a method for modifying an unsaturated copolymer resin of propylene with a linear non-conjugated diene by introducing a hydroxy group into the olefinic unsaturated bond in the copolymer (Japanese Patent Laid-Open Publication No. 85404/1986) has been proposed. In this method, however, it was difficult, to the best of our knowledge, to hydroxylize substantially all of the unsaturated bonds, and gelation was sometimes caused on the fabrication such as molding of the resin, so that the use of this method was limited to some special cases. Further, this method may require a large amount of the expensive linear non-conjugated diene to be copolymerized due to its low copolymerizability and may give only a low production yield of the copolymer to the amount of a catalyst used, that is, a low catalyst activity.

As another method, a method for copolymerizing a vinyl monomer of which the hydroxyl group has been protected with a trialkylsilyl group with an α-olefin (J. Polym. Sci., Part C, No. 22, 157-175, 1968) has been proposed. In this method, the vinyl monomer may be synthesized only in a low yield and a catalyst activity in polymerization may be low.

On the other hand, Japanese Patent Laid-Open Publication No. 132604/1989 discloses a modification product of an α-olefin polymer in a solution by hydroxylation. However, none of the products obtained by the method may exhibit sufficient mechanical strength at any practical level as a molded article and have compatibility in a polymer blend to any satisfactory level, so that a still further improvement of the method may be desired, as long as we are aware.

Also, a method in which living polymerization of polypropylene is conducted in the presence of a vanadium catalyst and hydroxyl group is introduced at the end of the polymer (High Polymers (in Japanese), Vol. 35, No. 11, 1986) has been proposed. In this method, polymerization may be conducted at a low temperature, and multi-step reaction may be required for introducing the hydroxyl group, whereby difficulty may be encountered in the practical application of this method.

In addition, further attempts to introduce functional groups at the end of a polyolefin have been reported. For instance, the introduction of a carboxylic acid or an acid anhydride thereof in Japanese Patent Laid-Open Publication Nos. 23904/1988, 37102/1988 or 173008/1989 has been proposed. There has also been proposed the introduction of a halogen in Japanese Patent Laid-Open Publication No. 158709/1987.

However, no proposal has hitherto been made, to the best of our knowledge, for the introduction of a sulfonic group which is anticipated to impart a variety of properties to the polyolefins.

SUMMARY OF THE INVENTION

An object of the present invention is to solve the aforementioned problems. This object is achieved by introducing a particular functional group to a particular olefin polymer having an olefinic unsaturated bond at its terminus.

More particularly, the present invention presents a functionalized olefin polymer which is a modified α-olefin polymer comprising at least one of an α-olefin having 3 to 20 carbon atoms, having olefinic unsaturated bond at its terminus and having a triad fraction [rr] of 0.7 or more in the measurement of $^{13}$C-NMR so that a functional group selected from the group consisting of an epoxy group, a hydroxyl group and a sulfonic acid has been introduced into the olefinic unsaturated bond at the terminus of the polymer.

The functionalized polymers according to the present invention have a highly reactive functional group in their molecules and have excellent adhesion relative to materials such as various inks, paints, aluminium and the other metals. The polymers according to the present invention also exhibit superior compatibilizing effect in the polymer blends with the other resins and thus can improve the impact resistance, for example, of a polymer blend of polyphenylene ether and polypropylene as in Application Example-1 presented hereinafter.

In the functionalized polymers according to the present invention, the problem of gelation during fabrication such as molding has also been solved. The polymer according to the present invention is also excellent from the viewpoint of economy, as it requires no expensive special monomers such as non-conjugated diene and is produced in a high yield relative to the catalyst.

DETAILED DESCRIPTION OF THE INVENTION

Unsaturated polymers to be modified

The unsaturated polymers used in the present invention comprise at least one of the α-olefins having 3 to 20, preferably 3 to 12 carbon atoms and have an olefinic unsaturated bond at its terminus and a triad [rr] fraction of at least 0.7, preferably at least 0.75 and more preferably at least 0.8. The upper limit of the [rr] fraction is preferably 1, more preferably 0.99. These polymers are characterized by the fact that substantially all of one terminus of the polymer chains assumes a vinylidene bond.

The term "triad fraction" as herein used means the ratio (y/x) of the number y of triads having the [rr] structure to the total number x of the three stereoisomeric structures, that is, [mm] (isotactic), [mr] (heterotactic) and [rr] (syndiotactic) which can be taken by the "triad" which is the minimum unit of the stereostructure as the monomer unit in the α-olefin polymers, that is, the "trimer".

The unsaturated polymer can have any molecular weight, which is generally in the range of 1,000 to 1,000,000, preferably 2,000 to 500,000, more preferably 5,000 to 200,000 as the number average molecular weight measured by gel permeation chromatography.

The measurement of $^{13}$C-NMR was conducted with a JEOL. FX-200 spectrometer manufactured by a Japanese corporation Nippon Denshi, under the measuring conditions of a temperature of 130° C., a frequency of 50.1 MHz, a spectrum width of 8,000 Hz, a pulse repeating time of 2.0 seconds, a pulse width of 7 μseconds and an integration number of 10,000 to 50,000. The spectrum obtained was analyzed on the basis of the analytical methods described by A. Zambelli, Macromolecules, 21, 617 (1988) and Tetsuro Asakura, Abstracts of The Society of Polymer Science, Japan, 36 (8), 2408 (1987).

These unsaturated polymers can be prepared, as is described hereinafter, by contacting an α-olefin with a catalyst comprising particular components (A) and (B) thereby polymerize the α-olefin.

α-olefins

As the examples of the α-olefins used in the present invention, propylene, 1-butene, 1-hexene, 3-methyl-1-butene, 3-methyl-1-pentene, 4-methyl-1-pentene, 3,3-dimethyl-1-butene, 4,4-dimethyl-1-pentene, 3-methyl-1-hexene, 4-methyl-1-hexene, 4,4-dimethyl-1-hexene, 5-methyl-1-hexene, allylcyclopentane, allylcyclohexane, allylbenzene, 3-cyclohexyl-1-butene, vinylcyclopropane, vinylcyclohexane, and 2-vinylbicyclo[2,2,1]heptane can be mentioned. Preferred examples among these α-olefins are propylene, 1-butene, 1-hexene, 3-methyl-1-butene, 3-methyl-1-pentene, 4-methyl-1-pentene, and 3-methyl-1-hexene, particularly propylene, 1-butene, 3-methyl-1-butene and 4-methyl-1-pentene. These α-olefins may be used alone or in combination of the two or more thereof. In the case of copolymers, ethylene can also be employed as a comonomer. When two or more α-olefins are used, these α-olefins may be distributed at random or in blocks within the unsaturated polymer.

More preferable α-olefin is propylene or a mixture of propylene with another α-olefin in which propylene predominates.

Catalysts

The unsaturated polymers used in the present invention can be prepared by contacting the aforementioned α-olefin with a catalyst thereby to polymerize it, the catalyst comprising the components (A) and (B) described below. In this connection, the term "comprising" means that the components for the catalyst are not only those named, viz. (A) and (B), but may include other appropriate components which will not interfere with the nature of the present invention.

Component (A)

The component (A) is a metallocene compound and specifically a transition metal compound represented by the following general formula:

$$Q_a(C_pR^1{}_m)(C_pR^2{}_n)MeXY \qquad [I]$$

wherein: Q represents a bonding group which crosslinks the cyclopentadienyl groups $(C_pR^1{}_m)$ and $(C_pR^2{}_n)$; a denotes an integer of 0 or 1, preferably 1; $C_p$ represents a cyclopentadienyl group or a substituted cyclopentadienyl ring; $R^1$ and $R^2$ independently represent hydrocarbyl groups or silicon-containing hydrocarbyl groups, the hydrocarbyl group being in a linear or a branched configuration; Me represents a transition metal of the groups IVB-VIB in the Periodic Table; X and Y represent independently a hydrogen atom, a halogen atom, a hydrocarbyl group, an alkoxy group, an amino group or a silicon-containing hydrocarbyl group, in which X and Y may be the same or different; m represents an integer in the range of $0 \leq m \leq 2$ and n represents an integer in the range of $2 \leq n \leq 4$ whereby, when m or n are more than one, a plurality of $R^1$ or $R^2$ can be connected to form a ring structure together with the carbon atoms to which $R^1$ or $R^2$ is bonded in the cyclopentadienyl group and a plurality of each of $R^1$ and $R^2$ may be the same or different; and $(CpR^1{}_m)$ and $(CpR^2{}_n)$ preferably represent different structures from each other.

Q, $R^1$, $R^2$, $C_p$, Me, X and Y in the general formula [I] are described in detail below.

Q is a bonding group which crosslinks the cyclopentadienyl groups indicated and specifically includes (i) an alkylene group such as a methylene group, an ethylene group, an isopropylene group, or a diphenylmethylene group; (ii) a silylene group such as a silylene group, a dimethylsilylene group, a disilylene group, or a tetramethyldisilylene group; and (iii) a hydrocarbyl group containing germanium, phosphorus, nitrogen, boron or aluminium, wherein the hydrocarbyl group or the hydrocarbyl moiety in these groups (i)–(iii) may have 1 to 30, preferably 1 to 20 carbon atoms. Q is preferably an alkylene group or a silylene group, more preferably an alkylene group.

$R^1$ and $R^2$ represent independently a hydrocarbyl group having 1 to 20, preferably 1 to 10 carbon atoms, or a silicon-containing hydrocarbyl group having 1 to 20, preferably 1 to 10 carbon atoms. $R^1$ and $R^2$ may or may not be bonded with the cyclopentadienyl groups at plural sites. If either $R^1$ and $R^2$ is present in plurality, these groups may be the same or different.

$C_p$ is a cyclopentadienyl group or a substituted cyclopentadienyl ring, the substituent, viz. $R^1$ and $R^2$, being a hydrocarbyl group having 1 to 20, particularly 1 to 10 carbon atoms. One of the typical examples of the hydrocarbyl group is an alkyl group. Another typical example is an alkylene or alkenylene group which forms a fused ring together with the cyclopentadienyl group. Thus, $C_p$ includes a conjugated five-membered ring such as indene or fluorene in addition to the cyclopentadiene, and, since the alkylene or alkenylene group can be one in the form of a branched chain, these fused five-membered rings can thus be ones having a hydrocarbyl substituent.

Me is a transition metal of the groups IVB-VIB, preferably the group IVB, in the Periodic Table.

X and Y represent independently (i) a hydrogen atom, (ii) a halogen atom, (iii) a hydrocarbyl group having 1 to 20, preferably 1 to 10 carbon atoms, (iv) a silicon-containing hydrocarbyl group having 1 to 40, preferably 1 to 20 carbon atoms, (v) an alkoxy group having 1 to 20, preferably 1 to 10 carbon atoms, (vi) an amino group or (vii) a carbon-containing amino group having 1 to 10 carbon atoms, in which X and Y may be the same or different.

m denotes an integer in the range of $0 \leq m \leq 2$, and n denotes an integer in the range of $2 \leq n \leq 4$, and $(C_p R^1 m)$ and $(C_p R^2 n)$ preferably represent different structures from each other.

The preferred component (A) is one in which the substituents $R^1$ are bonded to the 2- and 5-positions of $C_p$, and the substituents $R^2$ are bonded to the 3- and 4-positions of $C_p$.

Specific examples of the component (A) in which Me is zirconium include:

(1) bis(cyclopentadienyl)zirconium dichloride,
(2) bis(methylcyclopentadienyl)zirconium dichloride,
(3) bis(dimethylcyclopentadienyl)zirconium dichloride,
(4) bis(trimethylcyclopentadienyl)zirconium dichloride,
(5) bis(tetramethylcyclopentadienyl)zirconium dichloride,
(6) bis(pentamethylcyclopentadienyl)zirconium dichloride,
(7) bis(indenyl)zirconium dichloride,
(8) bis(fluorenyl)zirconium dichloride,
(9) bis(cyclopentadienyl)zirconium monochloride monohydride,
(10) bis(cyclopentadienyl)methylzirconium monochloride,
(11) bis(cyclopentadienyl)ethylzirconium monochloride,
(12) bis(cyclopentadienyl)phenylzirconium monochloride,
(13) bis(cyclopentadienyl)zirconium dimethyl,
(14) bis(cyclopentadienyl)zirconium diphenyl,
(15) bis(cyclopentadienyl)zirconium dineopentyl,
(16) bis(cyclopentadienyl)zirconium dihydride,
(17) (cyclopentadienyl)(indenyl)zirconium dichloride,
(18) (cyclopentadienyl)(fluorenyl)zirconium dichloride,
(19) methylenebis(indenyl)zirconium dichloride,
(20) ethylenebis(indenyl)zirconium dichloride,
(21) ethylenebis(indenyl)zirconium monohydride monochloride,
(22) ethylenebis(indenyl)methylzirconium monochloride,
(23) ethylenebis(indenyl)zirconium monomethoxy monochloride,
(24) ethylenebis(indenyl)zirconium diethoxide,
(25) ethylenebis(indenyl)zirconium dimethyl,
(26) ethylenebis(4,5,6,7-tetrahydroindenyl)zirconium dichloride,
(27) ethylenebis(2,4-dimethylcyclopentadienyl)(3',4'-dimethylcyclopentadienyl)zirconium dichloride,
(28) isopropylidenebis(indenyl)zirconium dichloride,
(29) isopropylidenebis(2,4-dimethylcyclopentadienyl)-(3',4'-dimethylcyclopentadienyl)zirconium dichloride,
(30) dimethylsilylenebis(indenyl)zirconium dichloride,
(31) tetramethyldisilylenebis(indenyl)zirconium dichloride,
(32) dimethylsilylene(4,5,6,7-tetrahydroindenyl)-zirconium dichloride,
(33) dimethylsilylene(2,4-dimethylcyclopentadienyl)-(3',4'-dimethylcyclopentadienyl)zirconium dichloride,
(34) dimethylgermanebis(indenyl)zirconium dichloride,
(35) methylaluminiumbis(indenyl)zirconium dichloride,
(36) ethylaluminiumbis(indenyl)zirconium dichloride,
(37) phenylaluminiumbis(indenyl)zirconium dichloride,
(38) phenylphosphinobis(indenyl)zirconium dichloride,
(39) ethylboranobis(indenyl)zirconium dichloride,
(40) methylene(cyclopentadienyl)(3,4-dimethylcyclopentadienyl)zirconium dichloride,
(41) methylene(cyclopentadienyl)(3,4-dimethylcyclopentadienyl)zirconium chloride hydride,
(42) methylene(cyclopentadienyl)(3,4-dimethylcyclopentadienyl)zirconium dimethyl,
(43) methylene(cyclopentadienyl)(3,4-dimethylcyclopentadienyl)zirconium diphenyl,
(44) methylene(cyclopentadienyl)-(trimethylcyclopentadienyl)zirconium dichloride,
(45) methylene(cyclopentadienyl)-(tetramethylcyclopentadienyl)zirconium dichloride,
(46) isopropylidene(cyclopentadienyl)(3,4-dimethylcyclopentadienyl)zirconium dichloride,
(47) isopropylidene(cyclopentadienyl)(3-methylindenyl)zirconium dichloride,
(48) isopropylidene(cyclopentadienyl)(fluorenyl)zirconium dichloride,
(49) isopropylidene(2-methylcyclopentadienyl)(fluorenyl)zirconium dichloride,
(50) isopropylidene(2,5-dimethylcyclopentadienyl)(3',4'-dimethylcyclopentadienyl)zirconium dichloride,
(51) isopropylidene(2,5-dimethylcyclopentadienyl)(fluorenyl)zirconium dichloride,
(52) ethylene(cyclopentadienyl)(3,5-dimethylcyclopentadienyl)zirconium dichloride,
(53) ethylene(cyclopentadienyl)(fluorenyl)zirconium dichloride,
(54) ethylene(2,5-dimethylcyclopentadienyl)(fluorenyl)zirconium dichloride,
(55) ethylene(2,5-diethylcyclopentadienyl)(fluorenyl)zirconium dichloride,

(56) diphenylmethylene(cyclopentadienyl)(3,4-dimethylcyclopentadienyl)zirconium dichloride,
(57) diphenylmethylene(cyclopentadienyl)(3,4-diethylcyclopentadienyl)zirconium dichloride,
(58) cyclohexylidene(cyclopentadienyl)(fluorenyl)zirconium dichloride,
(59) cyclohexylidene(2,5-dimethylcyclopentadienyl)3',4'-dimethylcyclopentadienyl)zirconium dichloride,
(60) dimethylsilylene(cyclopentadienyl)(3,4-dimethylcyclopentadienyl)zirconium dichloride,
(61) dimethylsilylene(cyclopentadienyl)(trimethylcyclopentadienyl)zirconium dichloride,
(62) dimethylsilylene(cyclopentadienyl)(tetramethylcyclopentadienyl)zirconium dichloride,
(63) dimethylsilylene(cyclopentadienyl)(3,4-diethylcyclopentadienyl)zirconium dichloride,
(64) dimethylsilylene(cyclopentadienyl)(triethylcyclopentadienyl)zirconium dichloride,
(65) dimethylsilylene(cyclopentadienyl)(tetraethylcyclopentadienyl)zirconium dichloride,
(66) dimethylsilylene(cyclopentadienyl)(fluorenyl)zirconium dichloride,
(67) dimethylsilylene(cyclopentadienyl)(2,7-di-t-butylfluorenyl)zirconium dichloride,
(68) dimethylsilylene(cyclopentadienyl)(octahydrofluorenyl)zirconium dichloride,
(69) dimethylsilylene(2-methylcyclopentadienyl)(fluorenyl)zirconium dichloride,
(70) dimethylsilylene(2,5-dimethylcyclopentadienyl)(fluorenyl)zirconium dichloride,
(71) dimethylsilylene(2-ethylcyclopentadienyl)(fluorenyl)zirconium dichloride,
(72) dimethylsilylene(2,5-ethylcyclopentadienyl)(fluorenyl)zirconium dichloride,
(73) dimethylsilylene(2-methylcyclopentadienyl)(2,7-di-t-butylfluorenyl)zirconium dichloride,
(74) dimethylsilylene(2,5-dimethylcyclopentadienyl)(2,7-di-t-butyl-fluorenyl)zirconium dichloride,
(75) dimethylsilylene(2-ethylcyclopentadienyl)(2,7-di-t-butylfluorenyl)zirconium dichloride,
(76) dimethylsilylene(diethylcyclopentadienyl)(2,7-di-t-butyl-fluorenyl)zirconium dichloride,
(77) dimethylsilylene(methylcyclopentadienyl)(octahydrofluorenyl)zirconium dichloride,
(78) dimethylsilylene(dimethylcyclopentadienyl)(octahydrofluorenyl)zirconium dichloride,
(79) dimethylsilylene(ethylcyclopentadienyl)(octahydrofluorenyl)zirconium dichloride,
(80) dimethylsilylene(diethylcyclopentadienyl)(octahydrofluorenyl)zirconium dichloride,
(81) dimethylgermane(cyclopentadienyl)(fluorenyl)zirconium dichloride,
(82) phenylamino(cyclopentadienyl)(fluorenyl)zirconium dichloride, and
(83) phenylalumino(cyclopentadienyl)(fluorenyl)zirconium dichloride.

In the present invention, the aforelisted compounds in which chloride has been replaced by bromide or iodide can also be used.

When Me is titanium, hafnium, niobium, molybdenum or wolfram, compounds in which the central metal of the zirconium compounds aforelisted has been replaced by the corresponding metals are examples of such compounds.

Among these compounds, the compounds preferred as the component (A) are the zirconium compounds and the hafnium compounds. More preferable compounds are compounds in which a equals 1, particularly the zirconium compounds and the hafnium compounds which have a structure crosslinked with an alkylene group.

Component B

The component B is an alumoxane. The alumoxane is a product obtained by the reaction of one or more than one species of a trialkylaluminium and water. The trialkylaluminium preferably contains 1 to 12 carbon atoms, more preferably 1 to 6 carbon atoms.

Thus, typical examples of the component (B) include (i) the product derived from one species of trialkylaluminium and water such as methylalumoxane, ethylalumoxane, butylalumoxane, and isobutylalumoxane; and (ii) the product derived from two species of a trialkylaluminium and water such as methylethylalumoxane, methylbutylalumoxane, and methylisobutylalumoxane. Among these alumoxanes, methylalumoxane is particularly preferred. These alumoxanes can be used in combination of the two or more thereof. In the present invention, it is also possible to use the combination of the alumoxane and an alkylaluminium such as trimethylaluminium, triethylaluminium, triisobutylaluminium, and dimethylaluminium chloride. The alumoxane is generally a cyclic alumoxane represented by the general formula

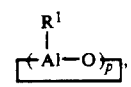

a linear alumoxane represented by the general formula

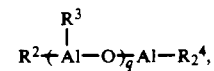

or a mixture thereof, in which $R^1$, $R^2$, $R^3$ and $R^4$ represent independently a hydrocarbyl branch having 1 to 8 carbon atoms, preferably a hydrocarbyl branch having 1 to 4 carbon atoms, most preferably a methyl group, respectively, and p and q each denotes a number in the range of 2 to 100 and 1 to 100, respectively.

The aforementioned alumoxanes are prepared by a variety of well-known methods. Specifically, the following methods can be mentioned:

(i) the method of the direct reaction of a trialkylaluminium with water in the presence of an appropriate organic solvent such as toluene, benzene, or ether;

(ii) the method of the reaction of a trialkylaluminium with a salt hydride containing water of crystallization such as a hydride of copper sulfate, or of aluminium sulfate; and (iii) the method of the reaction of a trialkylaluminium with water impregnated into silica gel.

Preparation of unsaturated polymers

In the polymerization of the α-olefin in the presence of the catalyst comprising the components (A) and (B), not only the conventional slurry polymerization method but also the liquid phase solvent-free polymerization method in which substantially no solvent is used, the solution polymerization method or the vapor phase polymerization method can be used. The polymerization can also be conducted by continuous polymerization or batch-wise polymerization or in a fashion of performing preliminary polymerization. As the polymerization solvent in the case of the slurry polymerization, a saturated aliphatic or aromatic hydrocarbon such as hexane, heptane, pentane, cyclohexane, benzene, toluene or a mixture thereof is used. The polymerization temperature is in the range from $-78°$ C. to about $200°$ C., preferably from $0°$ to $150°$ C., more preferably from $50°$ to $150°$ C. Hydrogen can also be used as an auxiliary molecular regulating agent.

The component (A) and the component (B) are used in an atomic ratio of 0.01 to 100,000, preferably 0.1 to 30,000 of the aluminium atom in the component (B) to the transition atom in the component (A), (B)/(A). The component (A) and the component (B) can be brought into contact separately on polymerization, or they can also be brought into contact preliminarily outside the polymerization reactor.

Modification of unsaturated polymers

According to the present invention, the aforementioned unsaturated polymer is modified so that a particular functional group, namely an epoxy group, a hydroxyl group or a sulfonic group, is introduced into the olefinic unsaturated bond at the terminus of the polymer. The term "hydroxyl group" herein used includes, in addition to an alcoholic hydroxyl group, a phenolic hydroxyl group, in which the former is preferred.

In the present invention, the introduction of the functional group into the olefinic unsaturated bond means the introduction of the functional group with utilization of the olefinic unsaturated bond. It is possible to introduce the functional group by generating the functional group on the olefinic unsaturated bond by, for example, the formation of a hydroxyl group or an epoxy group by the oxidation of an olefinic unsaturated bond, or by bonding through e.g. addition reaction a compound containing the functional group to the olefinic unsaturated bond.

The functional group is introduced in an amount of 1% or more, preferably 3% or more, more preferably 5% or more and most preferably 10% or more to the total number of olefinic unsaturated bonds in the mass of the unsaturated polymer. An introduced amount less than 1% results in a low content of the functional group and thus a poor modification effect. The upper limit of the introduced amount is preferably 1%, more preferably 0.99%.

While the methods for introducing an epoxy group into the olefinic unsaturated bond at the terminus of the unsaturated polymer are not restricted to specific ones, they are largely divided into the method of oxidation of the olefinic unsaturated bond, the method of addition reaction of a compound containing at least one epoxy group in the molecule to the olefinic unsaturated bond and the other methods such as introduction of a group which is a precursor to an epoxy group which is then converted into an epoxy group. The first method is preferred.

The examples of the method of oxidation of the olefinic unsaturated bond include (i) the oxidation by peracids such as performic acid, peracetic acid, and perbenzoic acid, (ii) the oxidation by an oxidizing agent such as sodium hypochlorite in the presence of a metal porphyrin complex, (iii) the oxidation by hydrogen peroxide or a hydroperoxide in the presence or absence of a catalyst such as a vanadium, wolfram or molybdenum compound, (iv) the oxidation by an alkaline hydrogen peroxide, or (v) the neutralization of the adduct with an alkali in an acetate/t-butyl hypochlorite system.

On the other hand, a group of the compounds containing at least one epoxy group in the molecule have an active hydrogen for performing addition reactions to an olefinic unsaturated bond, particularly a Michael addition reaction. Typical examples of the compounds include thiol compounds such as thioglycidol and glycidyl thioglycolate.

The reaction is performed in the swollen or dissolved states of the unsaturated polymer by a solvent or in the melted state thereof. The reaction in the dissolved or melted state is preferred. The solvent used for the reaction should be selected according to the type of the reaction and is often selected from an aliphatic, alicyclic or aromatic hydrocarbon or a halide thereof, an ester having at least 6 carbon atoms, a ketone of at least 3 carbon atoms, an ether of at least 3 carbon atoms and carbon disulfide. These solvents may or may not be used as a mixture of the two or more. The selectivity of the reaction is not required to be 100% in all cases, and the epoxidation products can contain some products by the possible side-reactions, provided that an epoxy group has been substantially introduced into the products.

While the method for introducing a hydroxyl group into the olefinic unsaturated bond at the terminus of the unsaturated polymer, on the other hand, is not restricted to particular ones, they are largely divided into the method of oxidation of the olefinic unsaturated bond, the method of addition reaction of a compound containing at least one hydroxyl group in the molecule to the olefinic unsaturated bond and the other methods such as introduction of a precursor group which is then converted into a hydroxyl group. The first method is preferred.

The examples of the methods of oxidation of olefinic unsaturated bond include (i) the oxidation by a peracid formed by aqueous hydrogen peroxide and an organic acid such as formic acid, (ii) the oxidation with a permanganate in the presence or absence of a phase transfer catalyst such as a quaternary ammonium salt, (iii) the oxidation with aqueous hydrogen peroxide, a permanganate or the like in the presence of an oxide of osmium, ruthenium, selenium or the like, (iv) the hydrolysis of an addition product of the unsaturated polymer with a halogen atom such as bromine or with a hydrogen halide or of an addition product of the unsaturated polymer with sulfuric acid, (v) the hydrolysis of an epoxy group which has been introduced into the unsaturated polymer by various reactions, and (vi) the hydroboration of the unsaturated polymer with a diborane or 9-borabicyclo[3.3.1]nonane (9-BBN) followed by the oxidation of the position borated.

On the other hand, a group of the compounds containing at least one hydroxyl group in the molecule have an active hydrogen for performing addition reactions to an olefinic unsaturated bond, particularly a Michael addition reaction. Typical examples of the compounds include thiol compounds such as thioglycerol and thioglycol. The hydroxyl group can also be introduced by the addition reaction to the unsaturated polymer of an aldehyde which is known as the Prince reaction, the oxidation reaction after hydroboration, and the demercurization after the oxymercurization with mercuric acetate or the like.

The reaction is performed in the swollen or dissolved states of the polymer by a solvent or in the melted state.

The reaction in the dissolved or melted state is preferred. The solvent used for the reaction should be selected according to the type of the reaction and is often selected from an aliphatic, alicyclic or aromatic hydrocarbon or a halide thereof, an ester having at least 6 carbon atoms, a ketone of at least 3 carbon atoms, an ether of at least 2 carbon atoms and carbon disulfide. These solvents may or may not be used as a mixture of the two or more. The selectivity of the reaction is not required to be 100% in all cases, and the hydroxylation products can contain some products by the possible side-reactions, provided that a hydroxyl group has been substantially introduced into the products.

The method for introducing a sulfonic group into the olefinic unsaturated bond at the terminus of the unsaturated polymer, on still other hand, is not restricted to specific ones. Examples of suitable methods are the method in which a sulfur trioxide based sulfonating agent is used, such as the method in which a sulfur trioxide donor, for example, sulfuric acid and acetic anhydride is used together with an acid anhydride, the method of reacting sulfur trioxide with the unsaturated polymer, and the method of reacting a halogenated sulfonic acid such as chlorosulfonic acid or the like with the unsaturated polymer. In addition, as a publication on sulfonation, E. E. Gilbert, "Sulfonation and Related Reactions", Interscience Publishers Inc. (1965) can be mentioned.

The reaction is performed in the swollen or dissolved states of the polymer by a solvent or in the melted state. The reaction in the dissolved or melted state is preferred. The solvent used for the reaction should be selected according to the type of the reaction and is chiefly selected from an aliphatic, alicyclic or aromatic hydrocarbon or a halide thereof, an ester having at least 6 carbon atoms, a ketone, an ether and carbon disulfide. These solvents may naturally be used as a mixed solvent of the two or more. The reaction in the melted state can be conducted also with a conventional granulator, a twin-screw kneader, a plastomill or the like. The selectivity of the reaction is not required to be 100% in all cases, and the sulfonation products can contain some products by the side-reactions, provided that a sulfonic acid group has been substantially introduced into the products.

FUNCTIONALIZED POLYMER

The modified and thus functionalized polymers according to the present invention exhibit characteristic properties owing to the special functional group at the end. For instance, the adhesion thereto of various printing inks and paints is excellent, and thus dyeing properties are afforded. It also has excellent adhesion to various metals such as copper and aluminium. Thus, the epoxy group introduced polymer has excellent adhesion to copper, and the hydroxyl group or sulfonic group introduced polymers have excellent adhesion to aluminium. Furthermore, the polymer also has excellent adhesion to the other resins. It has permanent antistatic properties and anti-fogging properties, and thus a gas barrier property is also expected by increasing the content of a hydroxyl group or a sulfonic group. It is also possible to impart properties such as anti-oxidation properties, UV absorption, photosensitivity, fluorescent properties, chromophoric properties, chelating properties or the like to the polymer by introducing compounds having functional groups which exhibit the aforementioned properties with the use of the reactivities of the functional groups introduced in the polymer.

In addition, the denaturated polymers according to the present invention also have excellent mechanical strength.

EXPERIMENTAL EXAMPLES

Examples of Preparation of the Unsaturated Polymer 11

Preparation of the catalyst component (A)

Synthesis of isopropylidene(cyclopentadienyl)(fluorenyl)zirconium dichloride

Into a 500-ml flask which had been thoroughly purged with nitrogen were introduced 200 ml of THF and 16.5 g of fluorene, and the mixture was cooled to a temperature of $-50°$ C. or lower. After 67 ml of a methyllithium in diethyl ether in a dilute solution (1.4 M) was added dropwise over a period of 30 minutes, the reaction was performed as the temperature was gradually raised to room temperature. The mixture was then cooled to a temperature of $-50°$ C. or lower again, and 10 g of 6,6-dimethylfulvene was added dropwise thereto over a period of 30 minutes. Upon completion of the addition, the temperature of the mixture was raised to room temperature, and the reaction was conducted for two days. Upon completion of the reaction, the reaction was stopped by adding 60 ml of $H_2O$, the ether layer was separated, dried over anhydrous $MgSO_4$ and evaporated to dryness to produce 17.6 g of crude crystals of 2-cyclopentadienyl-2-fluorenylpropane.

Then, a 10 g portion of the aforementioned crude crystals was diluted with 100 ml of THF; the mixture was cooled to a temperature of $-50°$ C. or lower; and 46.0 ml (0.0736 mole) of n-butyllithium was added thereto over a period of 10 minutes. The temperature of the mixture was raised to room temperature over a period of 1 hour, and the reaction was conducted for two hours. After the solvent was evaporated to dryness under a stream of nitrogen, 100 ml of dichloromethane was added, and the mixture was cooled to a temperature of $-50°$ C. or lower. Next, a solution of 8.16 g of zirconium tetrachloride in 50 ml of dichloromethane was poured into the mixture. After stirring of the resulting mixture, it was gradually heated to room temperature over a period of 3 hours and reacted overnight at the same temperature. Upon completion of the reaction, solid materials were removed by filtration. The filtrate was concentrated to conduct recrystallization. Thus, 4.68 g of a red product of isopropylidene(cyclopentadienyl)(fluorenyl)zirconium dichloride was obtained.

Preparation of the catalyst component (B)

Into 565 ml of a toluene solution of 48.2 g of trimethylaluminium was poured under agitation 50 g of copper sulfate pentahydrate at 0° C. in portions of 5 g at intervals of 5 minutes. Upon completion of the addition, the solution was heated to a temperature of 25° C., reacted at 25° C. for 2 hours, further heated to a temperature of 35° C. and reacted for 2 days. The residual solid of copper sulfate was removed, and the toluene solution of alumoxane was obtained. The concentration of methylalumoxane was 27.3 mg/ml (2.7 w/v%).

Preparation of the resin A

Into a 1.0-liter stainless steel autoclave equipped with a stirrer and a temperature regulating device were introduced 500 ml of thoroughly dehydrated and deoxygenated heptane, 580 mg of methylalumoxane and 0.432 mg (0.001 mmole) of isopropylidene(cyclopentadienyl)(fluorenyl)zirconium dichloride, and polymerization was conducted at a propylene pressure of 7 kg/cm$^2$G at 50° C. for 4 hours. After the polymerization was completed, the polymerization solution was taken out into 3 liters of methanol. The polymer was separated by filtration, and 133 g of a resin (resin-A) was recovered. As a result of analysis by gel permeation chromatography, the resin was found to have a number average molecular weight (Mn) of $26.9 \times 10^3$ and a molecular weight distribution (Mw/Mn=Q) of 2.21. When the $^{13}$C-NMR was measured with JEOL. FX-200, [:r] (triad) was 0.86, and thus the one terminus of the polymer chains of the polymer all had a vinylidene bond.

Preparation of resin-B

Into a 1.0-liter stainless steel autoclave equipped with a stirrer and a temperature regulating device were introduced 400 ml of thoroughly dehydrated and deoxygenated toluene, 20 mg of 1-hexene, 239 mg of methylalumoxane and 0.86 mg ($2.0 \times 10^6$ mole) of isopropylidene(cyclopentadienyl)(fluorenyl)zirconium dichloride, and polymerization was conducted at a propylene pressure of 3 kg/cm$^2$G at 15° C. for 4 hours. Upon completion of the polymerization, the polymerization solution was taken out into 3 liters of methanol. The polymer was separated by filtration, and then dried, and 58.7 g of a resin (resin-B) was obtained. When the $^{13}$C-NMR was measured, the 1-hexene content was 1.75 mole% and the one terminus of the polymer chains of the polymer all had a vinylidene bond, and [rr] (triad) was 0.91. The resin had a number average molecular weight (Mn) of $37.8 \times 10^3$ and a molecular weight distribution (Mw/Mn) of 1.96.

EXAMPLE 11

In a dried 300-ml flask, 5 g of the resin A obtained in the Example of Preparation of the Unsaturated Polymer 11 was dissolved in 100 ml of xylene at 100° C. To the solution was added dropwise a solution of 0.8 g of metachloroperbenzoic acid in 40 ml of xylene over a period of 1 hour, and the mixture was reacted at 100° C. for 3 hours. Then, the polymer solution was poured into a large amount of cold methanol to precipitate the polymer, which was separated by filtration, washed and dried under reduced pressure to produce a denaturated polymer.

It was confirmed by NMR spectrometry that an epoxy group had been introduced into the polymer and an amount of the olefinic unsaturated bond at the terminus of polymer chains of the polymer was converted into the epoxy group at percentage quantity of 81%.

EXAMPLE 12

In a dried 300-ml flask, 5 g of the resin A obtained in the Example of Preparation of the Unsaturated Polymer 11 was dissolved in 100 ml of xylene at 100° C. To the solution were added 0.4 g of cumene hydroperoxide, 0.01 g of molybdenum octylate and 0.05 g of triisopropyl borate, and the mixture was reacted at 110° C. for 3 hours. Then, the polymer solution was poured into a large amount of cold acetone to precipitate the polymer, which was separated by filtration, washed with an aqueous 2N NaOH solution and further with water, and dried under reduced pressure to produce a modified polymer.

It was confirmed by NMR spectrometry that an epoxy group had been introduced into the polymer, and an amount of the olefinic unsaturated bond at the terminus of polymer chains in the polymer was converted into the epoxy group at percentage of 80%.

EXAMPLE 13

The reaction was conducted as in Example 11 except that the resin B obtained in Example of Preparation of the Unsaturated Polymer 11 was used in place of the resin A.

It was confirmed by NMR spectrometry that an epoxy group had been introduced into the polymer, and an amount of the olefinic unsaturated bond at the terminus of polymer chains of the polymer was converted into the epoxy group at percentage of 59%.

EXAMPLE OF PREPARATION OF THE UNSATURATED POLYMER 21

In the same manner as in Example of Preparation of the Unsaturated Polymer 11, the catalyst components (A) and (B) and the resins A and B were prepared.

EXAMPLE 21

In a dried 300-ml flask, 5 g of the resin A obtained in the Example of Preparation of the Unsaturated Polymer 11 and 100 ml of xylene were placed, and the mixture was stirred at 100° C. to dissolve the resin A completely. To the solution which was maintained at 100° C. with stirring was added dropwise a mixture of 2.2 g of formic acid and 0.24 ml of aqueous hydrogen peroxide which had been preliminarily mixed over a period of 10 minutes, and the mixture was reacted at 100° C. for 2 hours. Then, the polymer solution was poured into a large amount of cold acetone to precipitate the polymer, which was separated by filtration, washed and dried under reduced pressure to produce a modified polymer in a yield of 98.1% by weight.

It was confirmed by the NMR spectrometry that a hydroxyl group had been introduced into the polymer, and an amount of the olefinic unsaturated bond at the end of polymer chains of the polymer was converted into the epoxy group at percentage of 92.0%.

EXAMPLE 22

In a dried 300-ml flask, 5 g of the resin B obtained in the Example of Preparation of the Unsaturated Polymer 21 and 100 ml of xylene were placed, and the mixture was stirred at 100° C. to dissolve the resin A completely. To the solution which was maintained at 100° C. with stirring was added dropwise a mixture of 2 g of acetic acid, 0.32 g of paraformaldehyde and 0.24 ml of 98% concentrated sulfuric acid which had been preliminarily mixed, and the mixture was reacted at 100° C. for 8 hours. Then, the polymer solution was neutralized with alcoholic NaOH, poured into a large amount of cold acetone to precipitate the polymer, which was separated by filtration, washed and dried under reduced pressure to produce a modified polymer in a yield of 95.7% by weight. It was confirmed by the NMR spectrometry that a hydroxyl group had been introduced into the polymer, and an amount of the olefinic unsaturated bond at the termionus of polymer chains of the polymer was converted into the hydroxyl group at percentage of 82.0%.

EXAMPLES OF PREPARATION OF THE UNSATURATED POLYMER 31

Preparation of the catalyst component (A)

Ethylenebis(indenyl)zirconium dichloride (A-1) and dimethylsilylbis(indenyl)zirconium dichloride (A-2) were synthesized in accordance with the methods described in *J. Orgmet. Chem.*, (342) 21-29, 1988 and in *J. Orgmet. Chem.*, (369) 359-370, 1989.

Isopropylidene(cyclopentadienyl)(fluorenyl)zirconium dichloride (A-3) was synthesized in accordance with the method disclosed in p. 7 of Japanese Patent Laid-Open Publication No. 41303/1990.

Preparation of the catalyst component (B)

Into 565 ml of a toluene solution containing 48.2 g of trimethylaluminium was poured under agitation 50 g of copper sulfate pentahydrate at 0° C. in portions of 5 g at intervals of 5 minutes. After the addition was completed, the solution was heated to a temperature of 25° C., reacted at 25° C. for 2 hours, further heated to a temperature of 35° C. and reacted for 2 days. A residual solid of copper sulfate was removed, and a toluene solution of alumoxane was obtained. The concentration of methylalumoxane was 27.3 mg/ml (2.7 w/v%).

Preparation of the resin A

Into a 1.0-liter stainless steel autoclave equipped with a stirrer and a temperature regulating device were introduced 400 ml of thoroughly dehydrated and deoxygenated toluene, 580 mg of methylalumoxane and 0.418 mg (0.001 mmole) of the component (A-1), and polymerization was conducted at a propylene pressure of 7 kg/cm$^2$G at 40° C. for 4 hours. Upon completion of the polymerization, the polymerization solution was taken out into 3 liters of methanol. The polymer precipitated was separated by filtration and dried, and 180 g of a resin (resin-A) was recovered. As a result of analysis by gel permeation chromatography, the resin was found to have a number average molecular weight (Mn) of $18.7 \times 10^3$ and a molecular weight distribution (Mw/Mn) of 1.99. When the $^{13}$C-NMR was measured With JEOL. FX-200, the [mm] fraction of triad was 0.888, and the one terminus of the polymer chains of the polymer all had vinylidene bonds (0.79 per 1,000 carbon atoms).

Preparation of the resin-B

Into a 1.0-liter stainless steel autoclave equipped with a stirrer and a temperature regulating device were introduced 500 ml of thoroughly dehydrated and deoxygenated heptane, 580 mg of methylalumoxane and 0.432 mg (0.001 mmole) of (A-3) as the component (A), and polymerization was conducted at a propylene pressure of 7 kg/cm$^2$G at 50° C. for 4 hours. After completion of the polymerization, the polymerization solution was taken out into 3 liters of methanol. The polymer precipitated was separated by filtration, and then dried, and 133 g of the resin-B was recovered. As a result of measurement by gel permeation chromatography, the resin was found to have a number average molecular weight (Mn) of $26.9 \times 10^3$ and a molecular weight distribution (Mw/Mn) of 2.21. When the $^{13}$C-NMR was measured, [rr] (triad) was 0.91, and the one terminus of the polymer chains in the polymer all had vinylidene bonds.

Preparation of the resin C

Into a 1.0-liter stainless steel autoclave equipped with a stirrer and a temperature regulating device were introduced 400 ml of thoroughly dehydrated and deoxygenated toluene, 20 ml of 1 hexene, 239 mg of methylalumoxane and 0.62 mg ($1.37 \times 10^6$ mole) of (A-2) as the component (A), and polymerization was conducted at a propylene pressure of 3 kg/cm$^2$G at 15° C. for 4 hours. After the polymerization was completed, the polymerization solution was taken out into 3 liters of methanol. The polymer precipitated was separated by filtration and dried, and 22.4 g of a resin (resin-C) was recovered. As a result of analysis by the $^{13}$C-NMR measurement, the content of 1-hexene was 0.9 mole%, the one end of the polymer chains of the polymer all had vinylidene bonds (0.32 per 1,000 carbon atoms), and the [mm] fraction of triad was 0.94. The resin was found to have a number average molecular weight (Mn) of $43.6 \times 10^3$ and a molecular weight distribution (Mw/Mn) of 2.23.

EXAMPLE OF PREPARATION OF TERMINAL AMINATED POLYPHENYLENE ETHER 20.0 g of poly(2,6-dimethyl-1,4-phenylene ether) (PPE, intrinsic viscosity: 0.30 dl/g) and 200 ml of toluene were charged into a reactor, and the mixture was stirred with heating at 80° C. to dissolve the polyphenylene ether. Subsequently, 7.0 g of a 50% aqueous sodium hydroxide solution as an alkaline catalyst and 2.0 g of trioctylmethylammonium as a phase transfer catalyst were added, and the reaction mixture was heated to 90° C. and stirred for 30 minutes. Then, 3.5 g of 2-chloroethylamine in the form of an aqueous solution was added to the mixture over a period of 15 minutes. Furthermore, the reaction mixture, after heating with stirring for 7 hours, was poured into 1.5 liters of methanol, and the modified resin produced was precipitated. The precipitate was separated by filtration, washed with 1 liter of water and further with 1 liter of methanol. Drying of the precipitate with heating at 80° C. under reduced pressure produced the terminal aminated polyphenylene ether in a yield of 100%. The reactivity of the polyphenylene ether terminus was 100%. The proton NMR spectrum proved the addition number of the halogenated primary amine to be one molecule.

EXAMPLE 31

To a dried 300-ml flask, 5 g of the resin A obtained in the Example of Preparation of the Unsaturated Polymer 31 and 100 ml of chlorobenzene were added, and the mixture was stirred at 100° C. to dissolve the resin A completely. To the solution, while it was maintained at 100° C. with stirring, was added 3.41 ml of acetic anhydride, and the resulting solution was cooled with stirring to room temperature. Then, 1.47 ml of concentrated sulfuric acid was added, and the mixture was reacted for 3 hours. Then, the polymer solution was poured into a large amount of cold acetone to precipitate the polymer, which was separated by filtration. The polymer was further separated by filtration, washed with acetone and water twice for each solvent and dried under reduced pressure to produce a denaturated polymer in a yield of 92.7% by weight. It was further confirmed by the IR spectrometry, NMR spectrometry and ion chromatography of the polymer that a sulfonic group was introduced into the polymer and an amount of the terminal olefinic unsaturated bond of polymer chains in the polymer was converted into the sulfonic group at ratio of 99.1%.

EXAMPLE 32

As a result of carrying out the procedure in Example 31 except that the unsaturated polymer was replaced with the resin B, the polymer was produced in a yield of 95.6% by weight, and the conversion of the terminal olefinic unsaturated bond into the sulfonic group was 97.5%.

EXAMPLE 33

As a result of carrying out the procedure in Example 31 except that the unsaturated polymer was replaced with the resin C, the polymer was produced in a yield of 94.1% by weight, and the conversion of the terminal olefinic unsaturated bond into the sulfonic group was 98.9%.

APPLICATION EXAMPLES 1 and 2

A polypropylene resin (manufactured by Mitsubishi Petrochemical, TA8), a maleic acid-modified polyphenylene ether (maleic acid content: 0.5% by weight; number average molecular weight Mn: 9,200, weight average molecular weight Mw: 31,000) and the epoxy group-containing polymer and the hydroxyl group-containing polymer obtained in Examples 11 and 21, respectively, were melt kneaded in the compositions shown in Tables 1 and 2 with a plastomill having an internal volume of 60 ml, which was manufactured by Toyo Seiki, Japan, under the conditions of 280° C. and 60 rpm of rotational speed. The resulting mixture was press molded at a temperature of 280° C. into a sheet having a thickness of 2 mm. Various test pieces were cut out from the sheet and subjected to evaluation of physical properties.

Measurement and Evaluation Method (1) Flexural modulus of elasticity

A test piece having a width of 25 mm and a length of 80 mm was processed by cutting and subjected to measurement by means of an Instron tester in accordance with JIS K7203.

(2) Izod impact strength

As for impact strength, three test pieces having a thickness of 2 mm were superimposed and subjected to measurement of Izod impact strength without notch at 23° C.

Results

Results obtained by the aforementioned measurements are shown in Tables 1 and 2. As is apparent from Tables 1 and 2, the compositions with the epoxy group containing α-olefin polymer (Table 1) and the compositions with the epoxy group containing α-olefin polymer according to the present invention (Table 2) show high impact strength.

APPLICATION EXAMPLE 3

The sulfonic group-containing polymer obtained in Examples 31 and 32, the terminal aminated polyphenylene ether obtained in Examples of Preparation of the Unsaturated Polymer 31 and 32 and the resins A and B were melt kneaded in the compositions shown in Table 1 under the conditions of 280° C. and 60 rpm of rotational speed. The resulting mixture was press molded at a temperature of 280° C. into a sheet having a thickness of 2 mm. Various test pieces were cut out from the sheet and subjected to evaluation of physical properties.

Measurement and Evaluation Method

Flexural modulus of elasticity and Izod impact strength were measured in the same manner as in Application Examples 1 and 2.

Results

Results obtained by the aforementioned methods are shown in Table 3. As is apparent from Table 3, the compositions with the sulfonic group containing α-olefin polymer according to the present invention show high impact strength.

TABLE 1

| (Functionalization: epoxy group) | | |
| --- | --- | --- |
| Test piece No. | (1) | (2) |
| Amount of polypropylene (part by weight) | 50 | 40 |
| Amount of maleic acid-modified polyphenylene ether (part by weight) | 50 | 50 |
| Epoxy group-containing α-olefin polymer | — | Example 11 |
| Amount of epoxy group-containing α-olefin polymer (part by weight) | 0 | 10 |
| Izod impact strength (kg cm/cm$^2$) | 7.8 | 17.2 |
| Flexural modulus of elasticity (kg/cm$^2$) | 14,700 | 14,900 |

TABLE 2

| (Functionalization: hydroxyl group) | | |
| --- | --- | --- |
| Test piece No. | (1) | (2) |
| Amount of polypropylene (part by weight) | 50 | 40 |
| Amount of maleic acid-modified polyphenylene ether (part by weight) | 50 | 50 |
| Hydroxyl group-containing α-olefin polymer | — | Example 21 |
| Amount of hydroxyl group-containing α-olefin polymer (part by weight) | 0 | 10 |
| Izod impact strength (kg cm/cm$^2$) | 7.8 | 18.1 |
| Flexural modulus of elasticity (kg/cm$^2$) | 14,700 | 15,000 |

TABLE 3

| (Functionalization: sulfonic group) | | | | |
| --- | --- | --- | --- | --- |
| Test piece No. | (1) | (2) | (3) | (4) |
| Sulfonic group-containing polymer (Example 31) (part by weight) | 60 | — | — | — |
| Sulfonic group-containing polymer (Example 32) (part by weight) | — | — | 60 | — |
| Resin A (part by weight) | — | 60 | — | — |
| Resin B (part by weight) | — | — | — | 60 |
| Terminal aminated | 40 | 40 | 40 | 40 |

TABLE 3-continued

| | (Functionalization: sulfonic group) | | | |
|---|---|---|---|---|
| Test piece No. | (1) | (2) | (3) | (4) |
| polyphenylene ether (part by weight) | | | | |
| Izod impact strength (kg cm/cm$^2$) | 10.1 | 4.3 | 12.5 | 6.1 |
| Flexural modulus of elasticity (kg/cm$^2$) | 9,270 | 9,110 | 8,800 | 8,730 |

What is claimed is:

1. A functionalized olefin polymer, comprising: an α-olefin polymer comprised of at least one α-olefin of 3 to 20 carbon atoms prepared by polymerizing said α-olefin in the presence of a catalyst comprising a combination of a metallocene compound and an alumoxane, which polymer is functionalized at the termini of the polymer chains with a functional group selected from the group consisting of an epoxy group, a hydroxyl group and a sulfonic acid group, said α-olefin polymer having a triad fraction [rr] of at least 0.7 as determined from measurement of the $^{13}$C-NMR spectrum of the polymer and, prior to functionalization, having terminal sites of olefinic unsaturation, which terminal sites are functionalized, and said functional groups being present in the polymer in an amount of 10% or more to the total number of olefinic unsaturated bonds in the mass of the unfunctionalized polymer.

2. A functionalized polymer according to claim 1, wherein said α-olefin having 3 to 20 carbon atoms is selected from the group consisting of propylene, 1-butene, 1-hexene, 3-methyl-1-butene, 3-methyl-1-pentene, 4-methyl-1-pentene and 3-methyl-1-hexene.

3. A functionalized polymer according to claim 1, wherein said α-olefin having 3 to 20 carbon atoms is selected from the group consisting of propylene, 1-butene, 3-methyl-1-butene and 4-methyl-1-pentene.

4. A functionalized polymer according to claim 1, wherein said α-olefin having 3 to 20 carbon atoms is selected from the group consisting of propylene and a mixture of propylene with another α-olefin wherein propylene is predominant.

5. A functionalized polymer according to claim 1, wherein said [rr] fraction of the triad is 0.75 or more.

6. A functionalized polymer according to claim 1, wherein said [rr] fraction of the triad is 0.8 or more.

7. A functionalized polymer according to claim 1, wherein said metallocene compound is represented by the following general formula:

$$Q_a(C_pR^1{}_m)(C_pR^2{}_n)MeXY \qquad [I]$$

wherein: Q represents a bonding group which cross-links the cyclopentadienyl groups ($C_pR^2{}_m$) and $C_pR^2{}_n$); a denotes an integer of 0 or 1, preferably 1; $C_p$ represents a cyclopentadienyl group or a substituted cyclopentadienyl group; $R^1$ and $R^2$ independently represent hydrocarbyl groups or silicon-containing hydrocarbyl groups, the hydrocarbyl group being in a linear or a branched configuration; Me represents a transition metal of the groups IVB-VIB in the Periodic Table; X and Y represent independently a hydrogen atom, a halogen atom, a hydrocarbyl group, an alkoxy group, an amino group or a silicon-containing hydrocarbyl group, in which X and Y may be the same or different; m represents an integer in the range of $0 \leq m \leq 2$ and n represents an integer in the range of $2 \leq n \leq 4$ whereby, when m or n is more than one, a plurality of $R^1$ or $R^2$ can be connected to form a ring structure together with the carbon atoms to which $R^1$ or $R^2$ is bonded in the cyclopentadienyl group and a plurality of each of $R^1$ and $R^2$ may be the same or different.

8. A functionalized polymer according to claim 7, wherein said metal is zirconium of hafnium, and $Q_a$ represents an alkylene group.

9. A functionalized polymer according to claim 7, wherein said moiety $C_pR^1{}_m$ and said moiety $C_pR^2{}_n$ are different from each other.

10. A functionalized polymer according to claim 1, wherein said functional group is an epoxy group which is formed by the oxidation of an olefinic unsaturated bond.

11. A functionalized polymer according to claim 1, wherein said functional group is a hydroxyl group which is introduced by the oxidation of an olefinic unsaturated bond.

12. A functionalized polymer according to claim 1, wherein said functional group is a sulfonic group which is introduced by the reaction of a sulfur trioxide-based sulfonating agent upon an olefinic unsaturated bond.

13. A functionalized polymer according to claim 1, wherein said functional group is a sulfonic group which is introduced by the reaction of a halogenated sulfonic acid upon an olefinic unsaturated bond.

14. The functionalized olefin polymer as claimed in claim 1, wherein the α-olefin is propylene or a mixture of propylene with another α-olefin in which propylene predominates.

15. The functionalized olefin polymer as claimed in claim 1, wherein the functional group is an epoxy group.

16. The functionalized olefin polymer as claimed in claim 1, wherein the functional group is a hydroxyl group.

17. The functionalized olefin polymer as claimed in claim 1, wherein the functional group is a sulfonic acid group.

* * * * *